US012694663B2

(12) United States Patent
Zhang et al.

(10) Patent No.:  US 12,694,663 B2
(45) Date of Patent:  Jul. 28, 2026

(54) SYSTEM AND METHOD TO GENERATE AUGMENTED TRAINING DATA FOR NEURAL NETWORK

(71) Applicant: ABB Schweiz AG, Baden (CH)

(72) Inventors: Qilin Zhang, Chicago, IL (US); Yinwei Zhang, Raleigh, NC (US); Biao Zhang, Apex, NC (US); Jorge Vidal-Ribas, Esplugues de Llobregat (ES)

(73) Assignee: ABB Schweiz AG, Baden (CH)

( * ) Notice: Subject to any disclaimer, the term of this patent is extended or adjusted under 35 U.S.C. 154(b) by 277 days.

(21) Appl. No.: 18/570,721

(22) PCT Filed: Jun. 17, 2021

(86) PCT No.: PCT/US2021/037798
§ 371 (c)(1),
(2) Date: Dec. 15, 2023

(87) PCT Pub. No.: WO2022/265644
PCT Pub. Date: Dec. 22, 2022

(65) Prior Publication Data
US 2025/0014322 A1     Jan. 9, 2025

(51) Int. Cl.
G06V 10/82            (2022.01)

(52) U.S. Cl.
CPC .................................... G06V 10/82 (2022.01)

(58) Field of Classification Search
None
See application file for complete search history.

(56) References Cited

U.S. PATENT DOCUMENTS

| | | | |
|---|---|---|---|
| 2004/0252882 A1 | 12/2004 | Krumm et al. | |
| 2016/0140436 A1 | 5/2016 | Yin et al. | |
| 2016/0189027 A1 | 6/2016 | Graves et al. | |
| 2017/0252922 A1 | 9/2017 | Levine et al. | |
| 2019/0354817 A1* | 11/2019 | Shlens ...................... | G06T 3/60 |
| 2020/0074211 A1* | 3/2020 | Georgis ................. | G06V 20/63 |

(Continued)

OTHER PUBLICATIONS

Liu et al., "Synthetic Data Augmentation Using Multiscale Attention CycleGAN for Aircraft Detection in Remote Sensing Images," *IEEE Geoscience and Remote Sensing Letters*, 19: 5 pp. (2022).

(Continued)

*Primary Examiner* — Leon Flores

(74) *Attorney, Agent, or Firm* — Fitch Even Tabin & Flannery LLP

(57)          ABSTRACT

A robotic system capable of being trained with a plurality of images that are synthetically augmented from an initial image data set includes a training system toward that end. An image augmentation system includes in one form a neural network trained to generate synthetic images using a generative adversarial network which includes the ability to synthesize images having various poses with adjustments to image parameters such as light and color among potential others. In another form the image augmentation system includes a set of images projected or transformed from its original pose to a number of different poses using an affine transform, and the ability to progress across an entire dimensional space of anticipated robot movements which produce various potential poses.

20 Claims, 9 Drawing Sheets

(56) References Cited

U.S. PATENT DOCUMENTS

| 2021/0097348 | A1 * | 4/2021 | Shlens | ................. | G06N 3/0464 |
| 2022/0284624 | A1 * | 9/2022 | Nimmagadda | ........ | G06V 20/10 |

OTHER PUBLICATIONS

Planche et al., "Seeing Beyond Appearance—Mapping Real Images into Geometrical Domains for Unsupervised CAD-based Recognition," *arXiv, Cornell Univ. Library, arXiv:1810.04158v1*, 16 pp. (Oct. 9, 2018).

Rad et al., "Domain Transfer for 3D Pose Estimation from Color Images Without Manual Annotations," *Computer Vision— ACCV2018, Lecture Notes in Computer Science (LNCS), Springer*, 69-84 (May 26, 2019).

European Patent Office, Extended European Search Report in European Patent Application No. 21946222.3, 9 pp. (Feb. 6, 2025).

Chen et al., "TAGAN: Tonality-Alignment Generative Adversarial Networks for Realistic Hand Pose Synthesis," downloaded from the Internet on Dec. 7, 2023 at: https://arxiv.org/pdf/1811.09916.pdf, 13 pp. (Dec. 13, 2020).

U.S. Patent and Trademark Office, International Search Report in International Patent Application No. PCT/US2021/037798, 2 pp. (Sep. 23, 2021).

U.S. Patent and Trademark Office, Written Opinion in International Patent Application No. PCT/US2021/037798, 4 pp. (Sep. 23, 2021).

* cited by examiner

SYSTEM AND METHOD TO GENERATE AUGMENTED TRAINING DATA FOR NEURAL NETWORK

TECHNICAL FIELD

The present disclosure generally relates to robotic operations in vehicle manufacturing, and more particularly, but not exclusively, to augmented training sets used to train a neural network in final trim and assembly robotic operations.

BACKGROUND

A variety of operations can be performed during the final trim and assembly (FTA) stage of automotive assembly, including, for example, door assembly, cockpit assembly, and seat assembly, among other types of assemblies. Yet, for a variety of reasons, only a relatively small number of FTA tasks are typically automated. For example, often during the FTA stage, while an operator is performing an FTA operation, the vehicle(s) undergoing FTA is/are being transported on a line(s) that is/are moving the vehicle(s) in a relatively continuous manner. Yet such continuous motions of the vehicle(s) can cause or create certain irregularities with respect to at least the movement and/or position of the vehicle(s), and/or the portions of the vehicle(s) that are involved in the FTA. Moreover, such motion can cause the vehicle to be subjected to movement irregularities, vibrations, and balancing issues during FTA, which can prevent, or be adverse to, the ability to accurately track a particular part, portion, or area of the vehicle directly involved in the FTA. Traditionally, three-dimensional model-based computer vision matching algorithms require subtle adjustment of initial values and frequently loses tracking due to challenges such as varying lighting conditions, parts color changes, and other interferences mentioned above. Accordingly, such variances and concerns regarding repeatability can often hinder the use of robot motion control in FTA operations.

Accordingly, although various robot control systems are available currently in the marketplace, further improvements are possible to provide a system and means to calibrate and tune the robot control system to accommodate such movement irregularities.

SUMMARY

One embodiment of the present disclosure is an augmentation system to develop training data for a neural network used in vehicle manufacturing operations. Other embodiments include apparatuses, systems, devices, hardware, methods, and combinations for using affine transforms or generative adversarial networks to generate augmented data. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
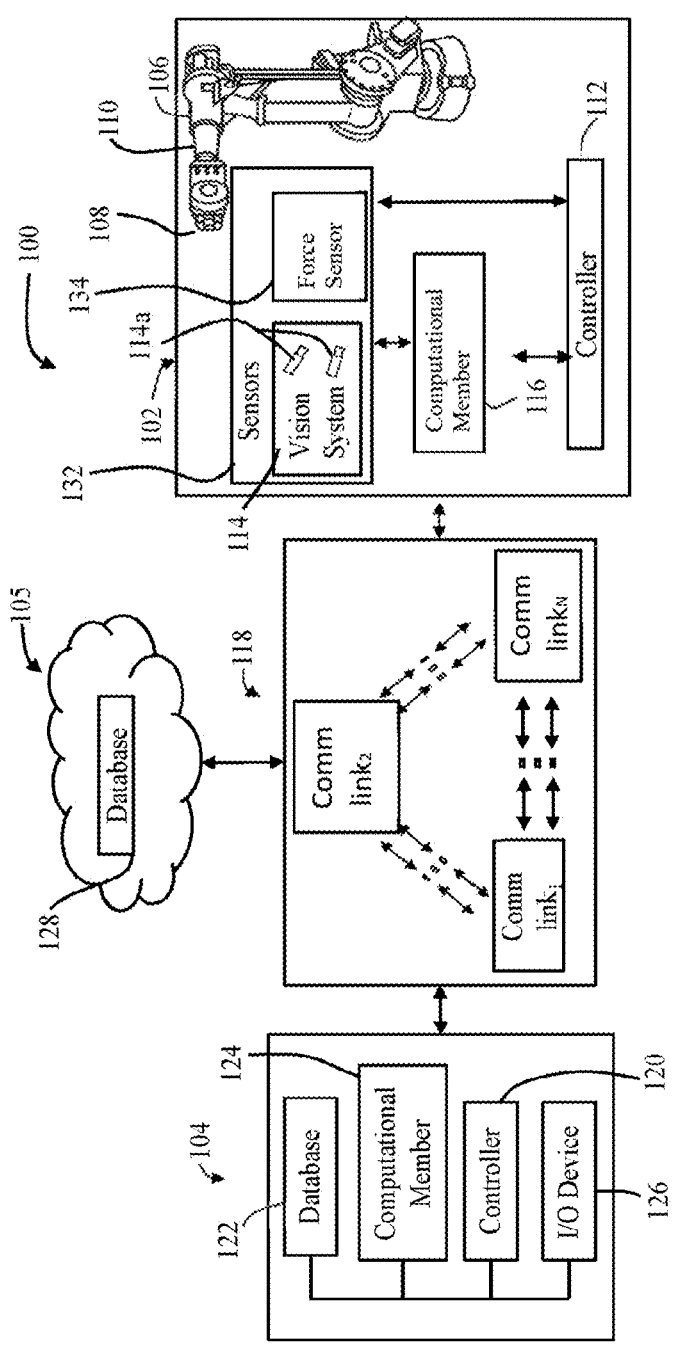
FIG. 1 illustrates a schematic representation of at least a portion of an exemplary robotic system according to an illustrated embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates at least a portion of an exemplary robotic system 100 that includes at least one robot station 102 that is communicatively coupled to at least one management system 104, such as, for example, via a communication network or link 118. The management system 104 can be local or remote relative to the robot station 102. Further, according to certain embodiments, the management system 104 can be cloud based. Further, according to certain embodiments, the robot station 102 can also include, or be in operable communication with, one or more supplemental database systems 105 via the communication network or link 118. The supplemental database system(s) 105 can have a variety of different configurations. For example, according to the illustrated embodiment, the supplemental database system(s) 105 can be, but is not limited to, a cloud based database.

According to certain embodiments, the robot station 102 includes one or more robots 106 having one or more degrees of freedom. For example, according to certain embodiments, the robot 106 can have, for example, six degrees of freedom. According to certain embodiments, an end effector 108 can be coupled or mounted to the robot 106. The end effector 108 can be a tool, part, and/or component that is mounted to a wrist or arm 110 of the robot 106. Further, at least portions of the wrist or arm 110 and/or the end effector 108 can be moveable relative to other portions of the robot 106 via operation of the robot 106 and/or the end effector 108, such for, example, by an operator of the management system 104 and/or by programming that is executed to operate the robot 106.

The robot 106 can be operative to position and/or orient the end effector 108 at locations within the reach of a work envelope or workspace of the robot 106, which can accommodate the robot 106 in utilizing the end effector 108 to perform work, including, for example, grasp and hold one or more components, parts, packages, apparatuses, assemblies, or products, among other items (collectively referred to herein as "components"). A variety of different types of end effectors 108 can be utilized by the robot 106, including, for example, a tool that can grab, grasp, or otherwise selectively hold and release a component that is utilized in a final trim and assembly (FTA) operation during assembly of a vehicle, among other types of operations. For example, the end effector 108 of the robot can be used to manipulate a component part (e.g. a car door) of a primary component (e.g. a constituent part of the vehicle, or the vehicle itself as it is being assembled).

Figure 2:
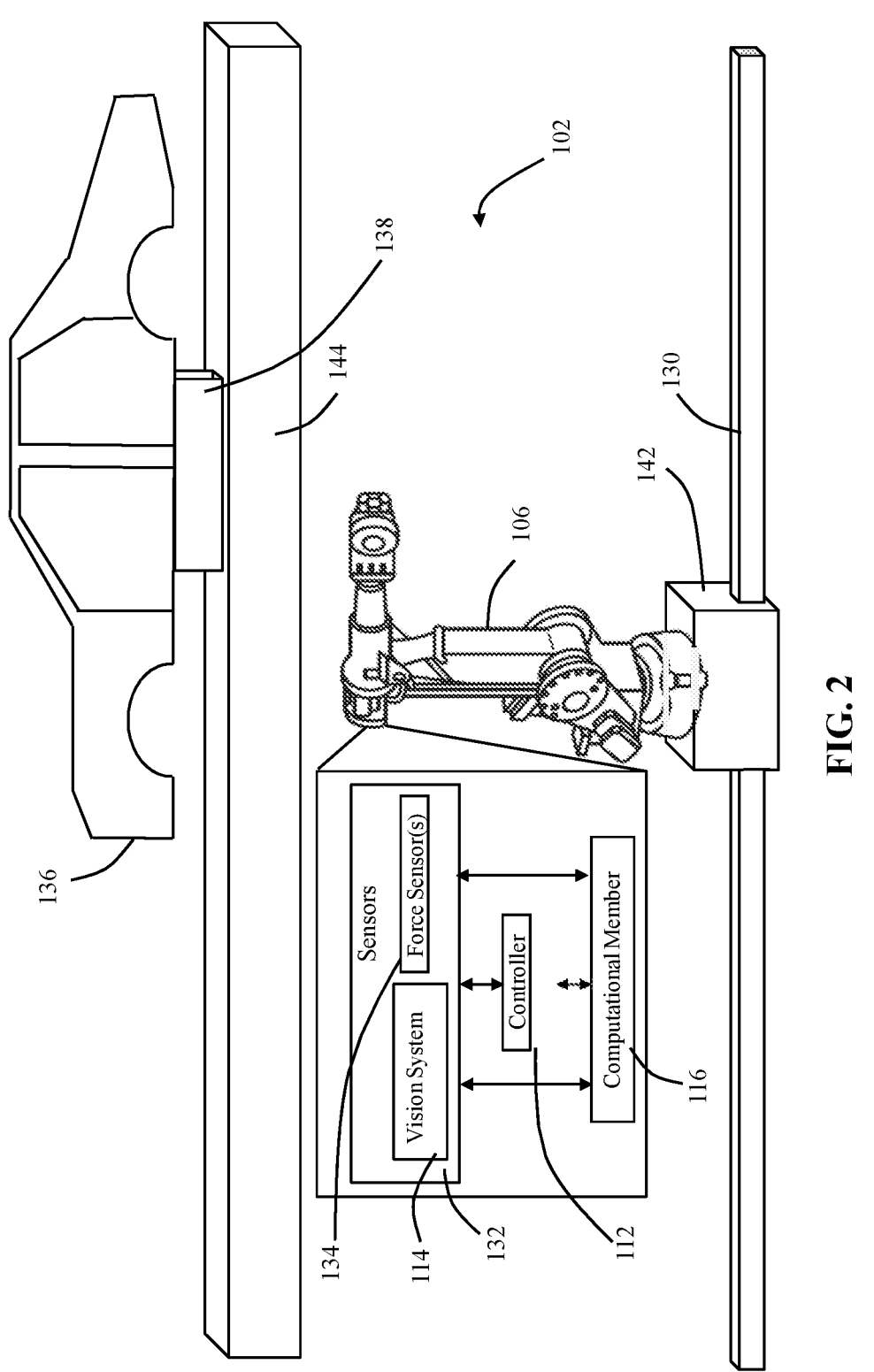
FIG. 2 illustrates a schematic representation of an exemplary robot station through which vehicles are moved through by an automated or automatic guided vehicle (AGC), and which includes a robot that is mounted to a robot base that is moveable along, or by, the track.

The robot 106 can include, or be electrically coupled to, one or more robotic controllers 112. For example, according to certain embodiments, the robot 106 can include and/or be electrically coupled to one or more controllers 112 that may, or may not, be discrete processing units, such as, for example, a single controller or any number of controllers. The controller 112 can be configured to provide a variety of functions, including, for example, be utilized in the selective delivery of electrical power to the robot 106, control of the movement and/or operations of the robot 106, and/or control the operation of other equipment that is mounted to the robot 106, including, for example, the end effector 108, and/or the operation of equipment not mounted to the robot 106 but which are an integral to the operation of the robot 106 and/or to equipment that is associated with the operation and/or movement of the robot 106. Moreover, according to certain embodiments, the controller 112 can be configured to dynamically control the movement of both the robot 106 itself, as well as the movement of other devices to which the robot 106 is mounted or coupled, including, for example, among other devices, movement of the robot 106 along, or, alternatively, by, a track 130 or mobile platform such as the AGV to which the robot 106 is mounted via a robot base 142, as shown in FIG. 2.

The controller 112 can take a variety of different forms, and can be configured to execute program instructions to perform tasks associated with operating the robot 106, including to operate the robot 106 to perform various functions, such as, for example, but not limited to, the tasks described herein, among other tasks. In one form, the controller(s) 112 is/are microprocessor based and the program instructions are in the form of software stored in one or more memories. Alternatively, one or more of the controllers 112 and the program instructions executed thereby can be in the form of any combination of software, firmware and hardware, including state machines, and can reflect the output of discrete devices and/or integrated circuits, which may be co-located at a particular location or distributed across more than one location, including any digital and/or analog devices configured to achieve the same or similar results as a processor-based controller executing software or firmware based instructions. Operations, instructions, and/or commands (collectively termed 'instructions' for ease of reference herein) determined and/or transmitted from the controller 112 can be based on one or more models stored in non-transient computer readable media in a controller 112, other computer, and/or memory that is accessible or in electrical communication with the controller 112. It will be appreciated that any of the aforementioned forms can be described as a 'circuit' useful to execute instructions, whether the circuit is an integrated circuit, software, firmware, etc. Such instructions are expressed in the 'circuits' to execute actions of which the controller 112 can take (e.g. sending commands, computing values, etc).

According to the illustrated embodiment, the controller 112 includes a data interface that can accept motion commands and provide actual motion data. For example, according to certain embodiments, the controller 112 can be communicatively coupled to a pendant, such as, for example, a teach pendant, that can be used to control at least certain operations of the robot 106 and/or the end effector 108.

In some embodiments the robot station 102 and/or the robot 106 can also include one or more sensors 132. The sensors 132 can include a variety of different types of sensors and/or combinations of different types of sensors, including, but not limited to, a vision system 114, force sensors 134, motion sensors, acceleration sensors, and/or depth sensors, among other types of sensors. It will be appreciated that not all embodiments need include all sensors (e.g. some embodiments may not include motion, force, etc sensors). Further, information provided by at least some of these sensors 132 can be integrated, including, for example, via use of algorithms, such that operations and/or movement, among other tasks, by the robot 106 can at least be guided via sensor fusion. Thus, as shown by at least FIGS. 1 and 2, information provided by the one or more sensors 132, such as, for example, a vision system 114 and force sensors 134, among other sensors 132, can be processed by a controller 120 and/or a computational member 124 of a management system 104 such that the information provided by the different sensors 132 can be combined or integrated in a manner that can reduce the degree of uncertainty in the movement and/or performance of tasks by the robot 106.

According to the illustrated embodiment, the vision system 114 can comprise one or more vision devices 114a that can be used in connection with observing at least portions of the robot station 102, including, but not limited to, observing, parts, component, and/or vehicles, among other devices or components that can be positioned in, or are moving through or by at least a portion of, the robot station 102. For example, according to certain embodiments, the vision system 114 can extract information for a various types of visual features that are positioned or placed in the robot station 102, such, for example, on a vehicle and/or on automated guided vehicle (AGV) that is moving the vehicle through the robot station 102, among other locations, and use such information, among other information, to at least assist in guiding the movement of the robot 106, movement of the robot 106 along a track 130 or mobile platform such as the AGV (FIG. 2) in the robot station 102, and/or movement of an end effector 108. Further, according to certain embodiments, the vision system 114 can be configured to attain and/or provide information regarding at a position, location, and/or orientation of one or more calibration features that can be used to calibrate the sensors 132 of the robot 106.

According to certain embodiments, the vision system 114 can have data processing capabilities that can process data or information obtained from the vision devices 114a that can be communicated to the controller 112. Alternatively, according to certain embodiments, the vision system 114 may not have data processing capabilities. Instead, according to certain embodiments, the vision system 114 can be electrically coupled to a computational member 116 of the robot station 102 that is adapted to process data or information output from the vision system 114. Additionally, according to certain embodiments, the vision system 114 can be operably coupled to a communication network or link 118, such that information outputted by the vision system 114 can be processed by a controller 120 and/or a computational member 124 of a management system 104, as discussed below.

Examples of vision devices 114a of the vision system 114 can include, but are not limited to, one or more imaging capturing devices, such as, for example, one or more two-dimensional, three-dimensional, and/or RGB cameras that can be mounted within the robot station 102, including, for example, mounted generally above or otherwise about the working area of the robot 106, mounted to the robot 106, and/or on the end effector 108 of the robot 106, among other locations. As should therefore be apparent, in some forms the cameras can be fixed in position relative to a moveable robot, but in other forms can be affixed to move with the robot. Some vision systems 114 may only include one vision device 114a. Further, according to certain embodiments, the vision system 114 can be a position based or image based vision system. Additionally, according to certain embodiments, the vision system 114 can utilize kinematic control or dynamic control.

According to the illustrated embodiment, in addition to the vision system 114, the sensors 132 also include one or more force sensors 134. The force sensors 134 can, for example, be configured to sense contact force(s) during the assembly process, such as, for example, a contact force between the robot 106, the end effector 108, and/or a component part being held by the robot 106 with the vehicle 136 and/or other component or structure within the robot station 102. Such information from the force sensor(s) 134 can be combined or integrated with information provided by the vision system 114 in some embodiments such that movement of the robot 106 during assembly of the vehicle 136 is guided at least in part by sensor fusion.

According to the exemplary embodiment depicted in FIG. 1, the management system 104 can include at least one controller 120, a database 122, the computational member 124, and/or one or more input/output (I/O) devices 126. According to certain embodiments, the management system 104 can be configured to provide an operator direct control of the robot 106, as well as to provide at least certain programming or other information to the robot station 102 and/or for the operation of the robot 106. Moreover, the management system 104 can be structured to receive commands or other input information from an operator of the robot station 102 or of the management system 104, including, for example, via commands generated via operation or selective engagement of/with an input/output device 126. Such commands via use of the input/output device 126 can include, but is not limited to, commands provided through the engagement or use of a microphone, keyboard, touch screen, joystick, stylus-type device, and/or a sensing device that can be operated, manipulated, and/or moved by the operator, among other input/output devices. Further, according to certain embodiments, the input/output device 126 can include one or more monitors and/or displays that can provide information to the operator, including, for example, information relating to commands or instructions provided by the operator of the management system 104, received/transmitted from/to the supplemental database system(s) 105 and/or the robot station 102, and/or notifications generated while the robot 106 is running (or attempting to run) a program or process. For example, according to certain embodiments, the input/output device 126 can display images, whether actual or virtual, as obtained, for example, via use of at least the vision device 114a of the vision system 114. In some forms the management system 104 can permit autonomous operation of the robot 106 while also providing functional features to an operator such as shut down or pause commands, etc.

According to certain embodiments, the management system 104 can include any type of computing device having a controller 120, such as, for example, a laptop, desktop computer, personal computer, programmable logic controller (PLC), or a mobile electronic device, among other computing devices, that includes a memory and a processor sufficient in size and operation to store and manipulate a database 122 and one or more applications for at least communicating with the robot station 102 via the communication network or link 118. In certain embodiments, the management system 104 can include a connecting device that may communicate with the communication network or link 118 and/or robot station 102 via an Ethernet WAN/LAN connection, among other types of connections. In certain other embodiments, the management system 104 can include a web server, or web portal, and can use the communication network or link 118 to communicate with the robot station 102 and/or the supplemental database system(s) 105 via the internet.

The management system 104 can be located at a variety of locations relative to the robot station 102. For example, the management system 104 can be in the same area as the robot station 102, the same room, a neighboring room, same building, same plant location, or, alternatively, at a remote location, relative to the robot station 102. Similarly, the supplemental database system(s) 105, if any, can also be located at a variety of locations relative to the robot station 102 and/or relative to the management system 104. Thus, the communication network or link 118 can be structured, at least in part, based on the physical distances, if any, between the locations of the robot station 102, management system 104, and/or supplemental database system(s) 105. According to the illustrated embodiment, the communication network or link 118 comprises one or more communication links 118 (Comm link$_{1-N}$ in FIG. 1). Additionally, system 100 can be operated to maintain a relatively reliable real-time communication link, via use of the communication network or link 118, between the robot station 102, management system 104, and/or supplemental database system(s) 105. Thus, according to certain embodiments, the system 100 can change parameters of the communication link 118, including, for example, the selection of the utilized communication links 118, based on the currently available data rate and/or transmission time of the communication links 118.

The communication network or link 118 can be structured in a variety of different manners. For example, the communication network or link 118 between the robot station 102, management system 104, and/or supplemental database system(s) 105 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an Ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

The database 122 of the management system 104 and/or one or more databases 128 of the supplemental database system(s) 105 can include a variety of information that may be used in the identification of elements within the robot station 102 in which the robot 106 is operating. For example, as discussed below in more detail, one or more of the databases 122, 128 can include or store information that is used in the detection, interpretation, and/or deciphering of images or other information detected by a vision system 114, such as, for example, features used in connection with the calibration of the sensors 132, or features used in connection with tracking objects such as the component parts or other devices in the robot space (e.g. a marker as described below). Additionally, or alternatively, such databases 122, 128 can include information pertaining to the one or more sensors 132, including, for example, information pertaining to forces, or a range of forces, that are to be expected to be detected by via use of the one or more force sensors 134 at one or more different locations in the robot station 102 and/or along the vehicle 136 at least as work is performed by the robot 106. Additionally, information in the databases 122, 128 can also include information used to at least initially calibrate the one or more sensors 132, including, for example, first calibration parameters associated with first calibration features and second calibration parameters that are associated with second calibration features.

The database 122 of the management system 104 and/or one or more databases 128 of the supplemental database system(s) 105 can also include information that can assist in discerning other features within the robot station 102. For example, images that are captured by the one or more vision devices 114a of the vision system 114 can be used in identifying, via use of information from the database 122, FTA components within the robot station 102, including FTA components that are within a picking bin, among other components, that may be used by the robot 106 in performing FTA.

FIG. 2 illustrates a schematic representation of an exemplary robot station 102 through which vehicles 136 are moved by an automated or automatic guided vehicle (AGV) 138, and which includes a robot 106 that is mounted to a robot base 142 that is moveable along, or by, a track 130 or mobile platform such as the AGV. While for at least purposes of illustration, the exemplary robot station 102 depicted in FIG. 2 is shown as having, or being in proximity to, a vehicle 136 and associated AGV 138, the robot station 102 can have a variety of other arrangements and elements, and can be used in a variety of other manufacturing, assembly, and/or automation processes. As depicted, the AGV may travel along a track 144, or may alternatively travel along the floor on wheels or may travel along an assembly route in other known ways. Further, while the depicted robot station 102 can be associated with an initial set-up of a robot 106, the station 102 can also be associated with use of the robot 106 in an assembly and/or production process.

Additionally, while the example depicted in FIG. 2 illustrates a single robot station 102, according to other embodiments, the robot station 102 can include a plurality of robot stations 102, each station 102 having one or more robots 106. The illustrated robot station 102 can also include, or be operated in connection with, one or more AGV 138, supply lines or conveyors, induction conveyors, and/or one or more sorter conveyors. According to the illustrated embodiment, the AGV 138 can be positioned and operated relative to the one or more robot stations 102 so as to transport, for example, vehicles 136 that can receive, or otherwise be assembled with or to include, one or more components of the vehicle(s) 136, including, for example, a door assembly, a cockpit assembly, and a seat assembly, among other types of assemblies and components. Similarly, according to the illustrated embodiment, the track 130 can be positioned and operated relative to the one or more robots 106 so as to facilitate assembly by the robot(s) 106 of components to the vehicle(s) 136 that is/are being moved via the AGV 138. Moreover, the track 130 or mobile platform such as the AGV, robot base 142, and/or robot can be operated such that the robot 106 is moved in a manner that at least generally follows of the movement of the AGV 138, and thus the movement of the vehicle(s) 136 that are on the AGV 138. Further, as previously mentioned, such movement of the robot 106 can also include movement that is guided, at least in part, by information provided by the one or more force sensor(s) 134.

Figure 3:
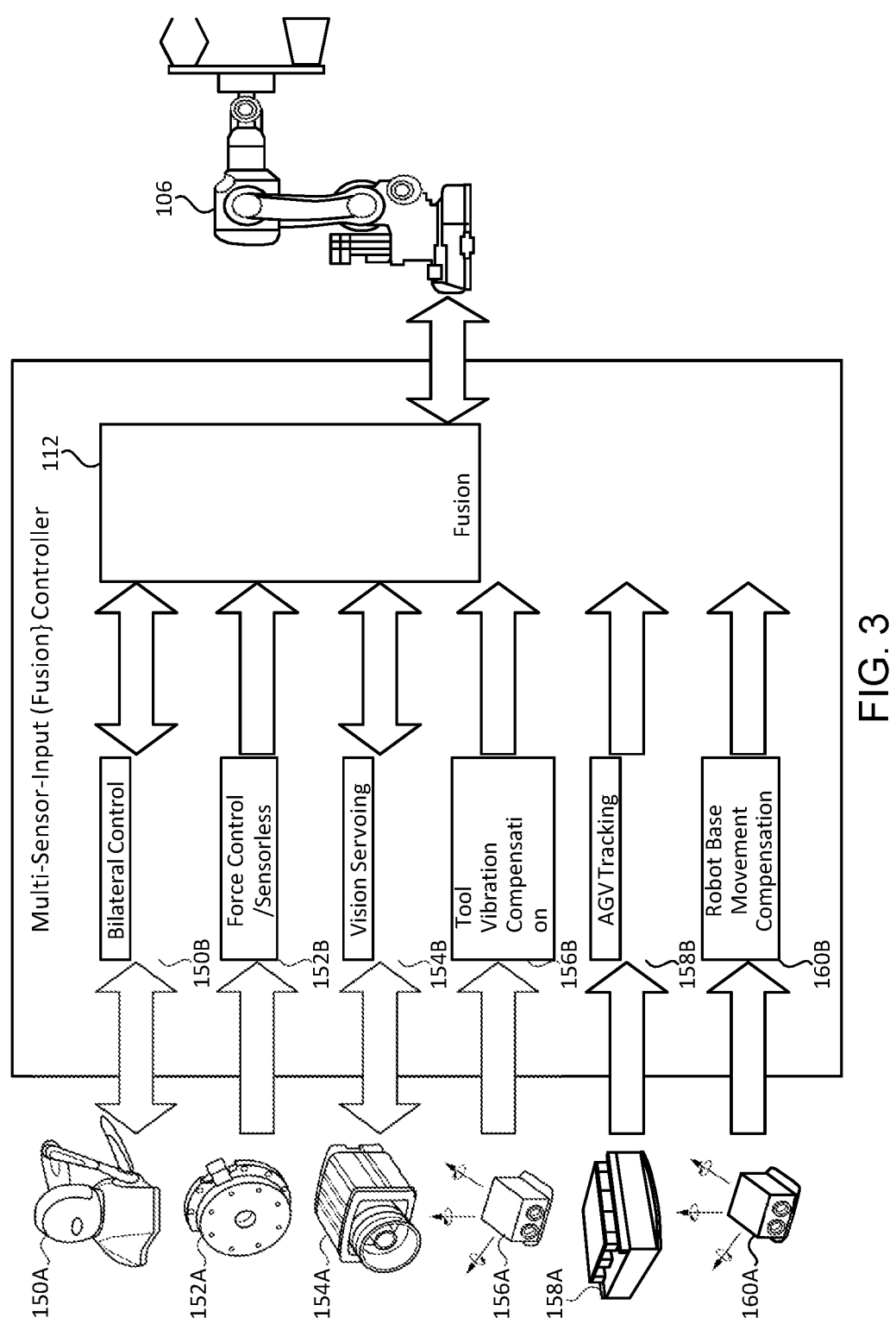
FIG. 3 illustrates sensor inputs that may be used to control movement of a robot.

FIG. 3 is an illustration of sensor inputs 150-160 that may be provided to the robot controller 112 in order to control robot 106 movement. For example, the robotic assembly system may be provided with a bilateral control sensor 150A in communication with a bilateral controller 150B. A force sensor 152A (or 134) may also be provided in communication with a force controller 152B. A camera 154A (or 114A) may also be provided in communication with a vision controller 154B (or 114). A vibration sensor 156A may also be provided in communication with a vibration controller 156B. An AGV tracking sensor 158A may also be provided in communication with a tracking controller 158B. A robot base movement sensor 160A may also be provided in communication with a compensation controller 160B. Each of the individual sensor inputs 150-160 communicate with the robot controller 112 and may be fused together to control movement of the robot 106.

Figure 4:
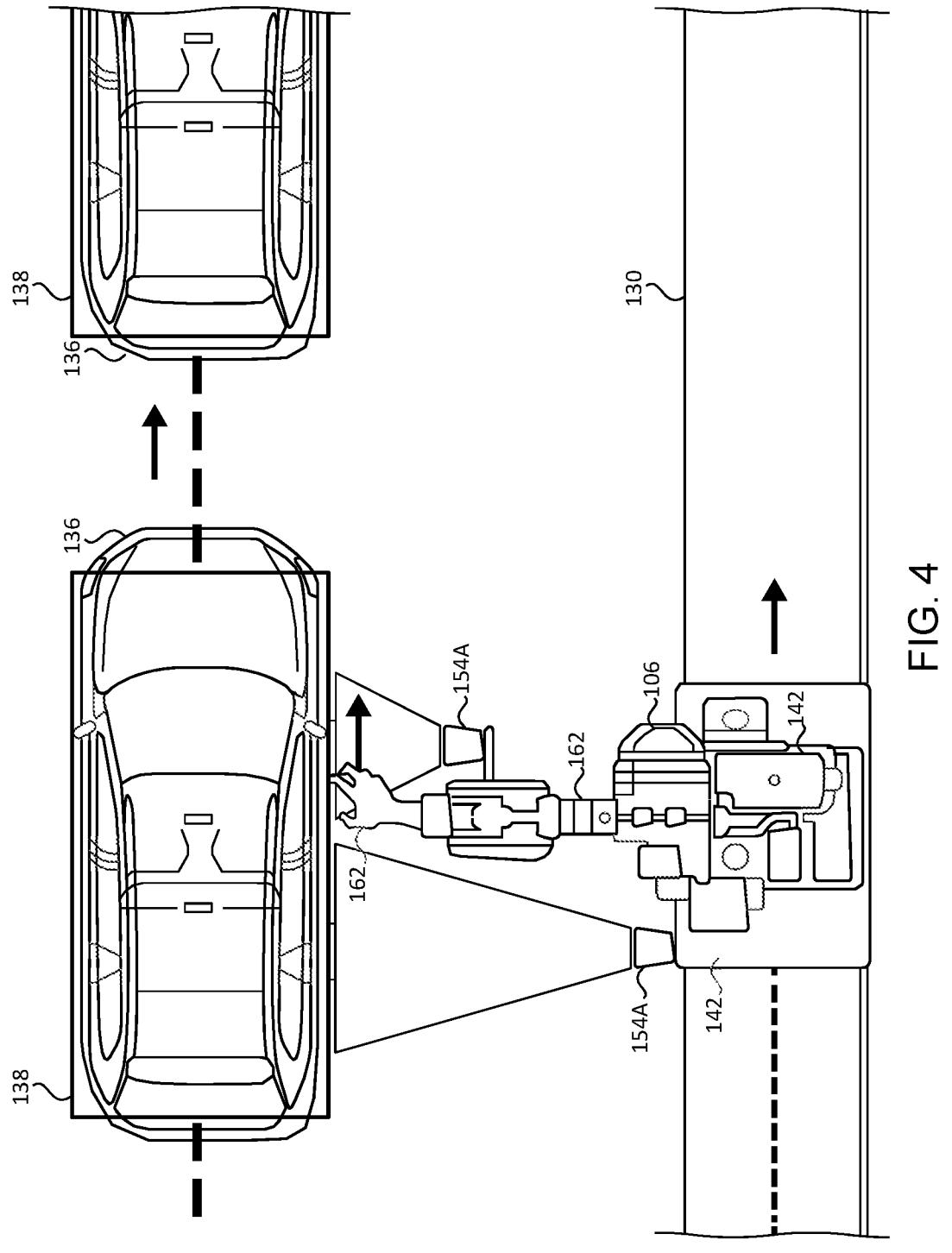
FIG. 4 illustrates an assembly line with a moving assembly base and a moving robot base.

FIG. 4 is another illustration of an embodiment of a robot base 142 with a robot 106 mounted thereon. The robot base 142 may travel along a rail 130 or with wheels along the floor to move along the assembly line defined by the assembly base 138 (or AGV 138). The robot 106 has at least one movable arm 162 that may move relative to the robot base 142, although it is preferable for the robot 106 to have multiple movable arms 162 linked by joints to provide a high degree of movement flexibility.

Figure 5:
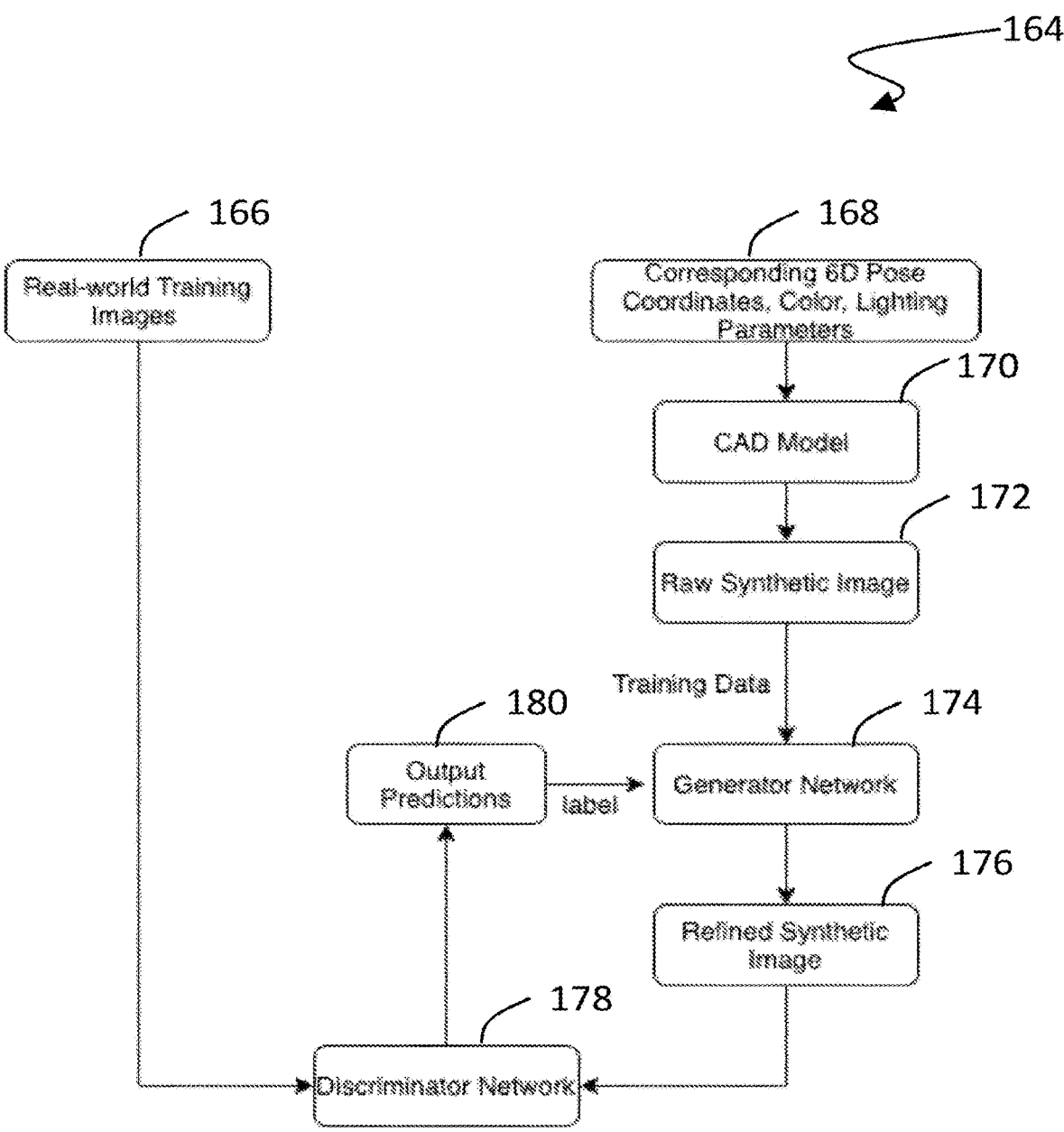
FIG. 5 illustrates a flow chart of one embodiment of a training system system where a generator network creates realistic images for augmenting a training set.
Figure 6:
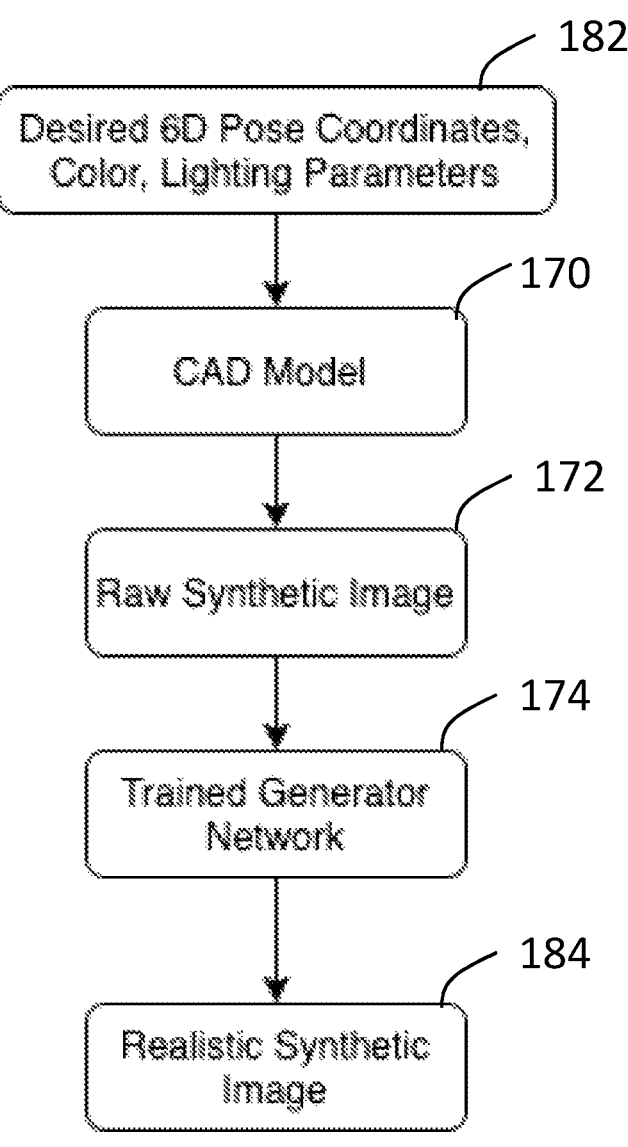
FIG. 6 illustrates a flow chart of one embodiment of implementing a generator network.

Turning now to FIGS. 5 and 6, an embodiment is disclosed of a system (which can be implemented by the controller 120 in some forms) structured to generate realistic images of component parts and/or primary components such as a vehicle. Such a generation of realistic images can be created given a desired pose of the realistic image and/or either or both of color and lighting parameters. FIG. 5 sets forth a flow chart in which a limited number of real-world training images are paired with the corresponding parameters (6-D pose coordinates of the component in the image, color, lighting, etc) which are then used to train a "Generator Network" which is constructed from a Generative Adversarial Network (GAN) paradigm 164. As will be appreciated, the 6-D pose coordinates are three translations relative to an origin along three axes, and three rotations about those three axes.

Real world images are provided to the system at 166 along with corresponding image parameters (pose, color, lighting, etc). Not all embodiments need include the full suite of image parameters. Some forms may only include pose. The image parameters are provided at 168 to begin the process or the training of the generator network. The image parameters are provided at 170 to a computer generated model (a computer aided design model in the illustrated embodiment, but other model types are also envisioned) from which a raw synthetic image is created at 172.

A generator network at 174 is structured to alter the raw synthetic image 172 and provide a refined synthetic image at 176 which is compared, via the discriminator network 178, to the real world image from the images in 166 which corresponds to the same image parameters used in the generation of the CAD model 170.

The discriminator network 178 is a classifier which attempts to determine whether the refined synthetic image is real or not, and is structured to generate an output prediction at 180, from which a label can be returned to the Generator Network 174. The discriminator network 178 will cycle through all training images and in a sense compete with the generator network 174 to flag 'synthetic' images as not real, but all the while the generator network 174 improves its ability to alter the raw synthetic images with the labeling feedback from the discriminator network 178. A threshold can be used to determine when the generator network 174 is sufficiently trained so that it provides refined synthetic images that are sufficiently real. An example of such a threshold can be, but not limited to, the prediction accuracy and/or precision and/or recall of the discriminator network 178.

FIG. 6 illustrates the implementation of the generator network 174 from the GAN procedure illustrated in FIG. 5 to create any number of realistic synthetic images. Any number of desired 6D pose coordinates, color parameter and lighting parameters 182 can be defined in advance, or automatically defined by a routine taking into account any number of desired settings. In similar fashion to the computer based model in FIG. 6, the desired parameters are provided to the computer model 170 and raw synthetic images are output at 172. The generator network 174, which was trained using the process described in FIG. 5, is able to produce a realistic synthetic image at 184 based solely upon the desired 6D pose coordinates and image properties such as color and lighting. Any number of realistic synthetic images are possible across any number of combinations of image parameters of pose, color, lighting, etc. where it may be inconvenient, costly, or impossible to obtain real images.

Figure 7:
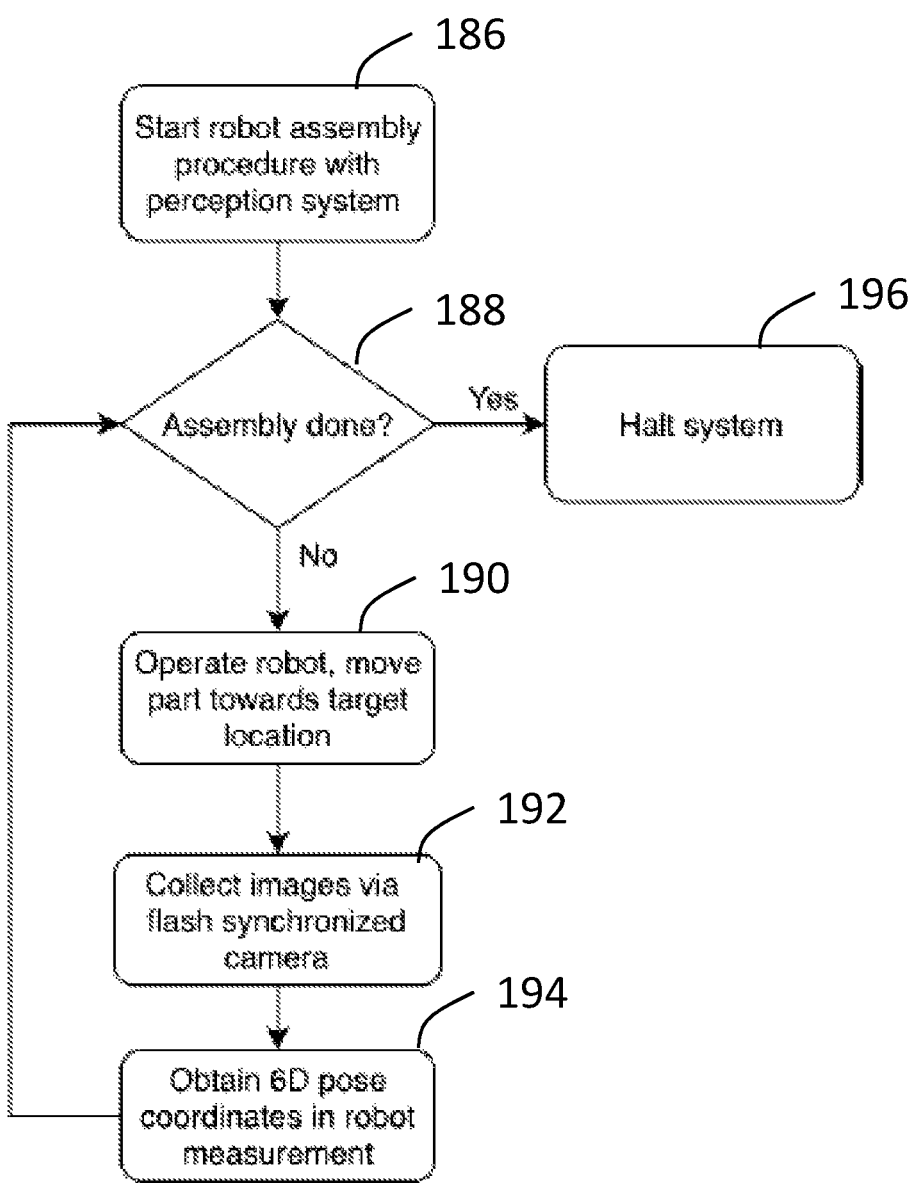
FIG. 7 illustrates an embodiment describing the collection of images related to a robotic operation.
Figure 8:
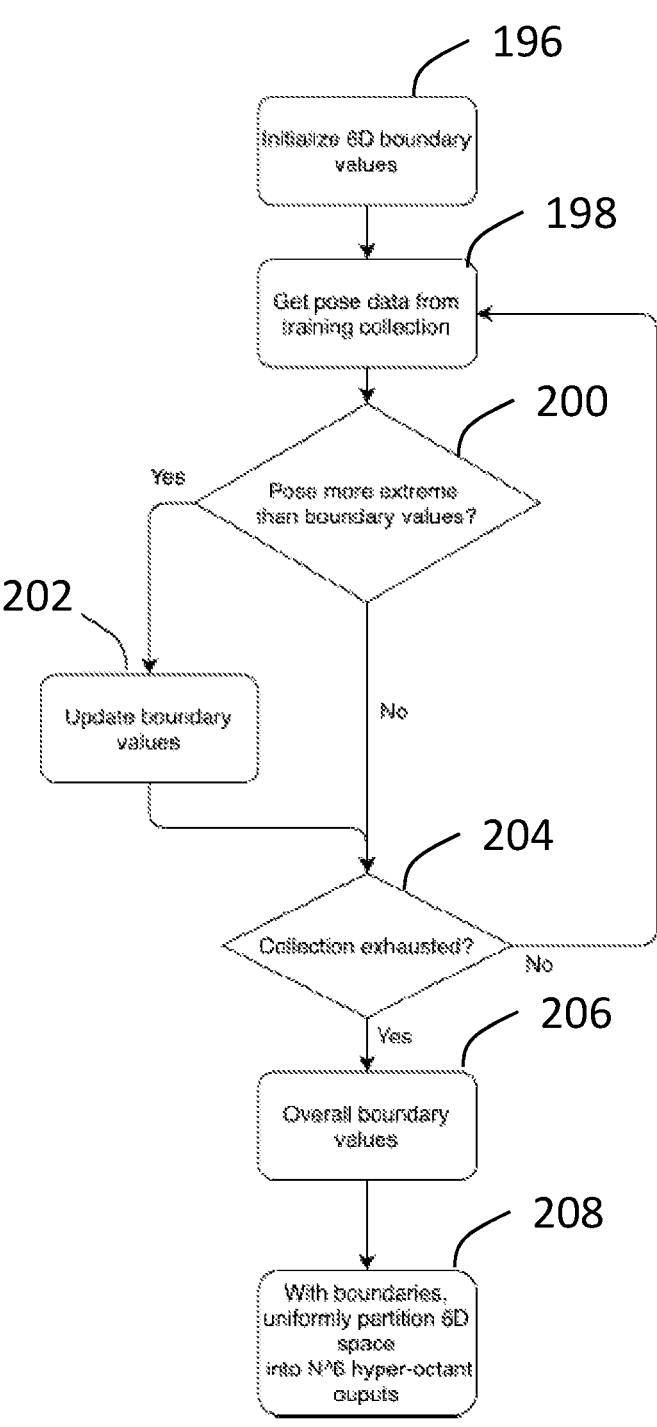
FIG. 8 illustrates a flow chart of updating boundary values used for a hyper-octant creation of an augmented data set.
Figure 9:
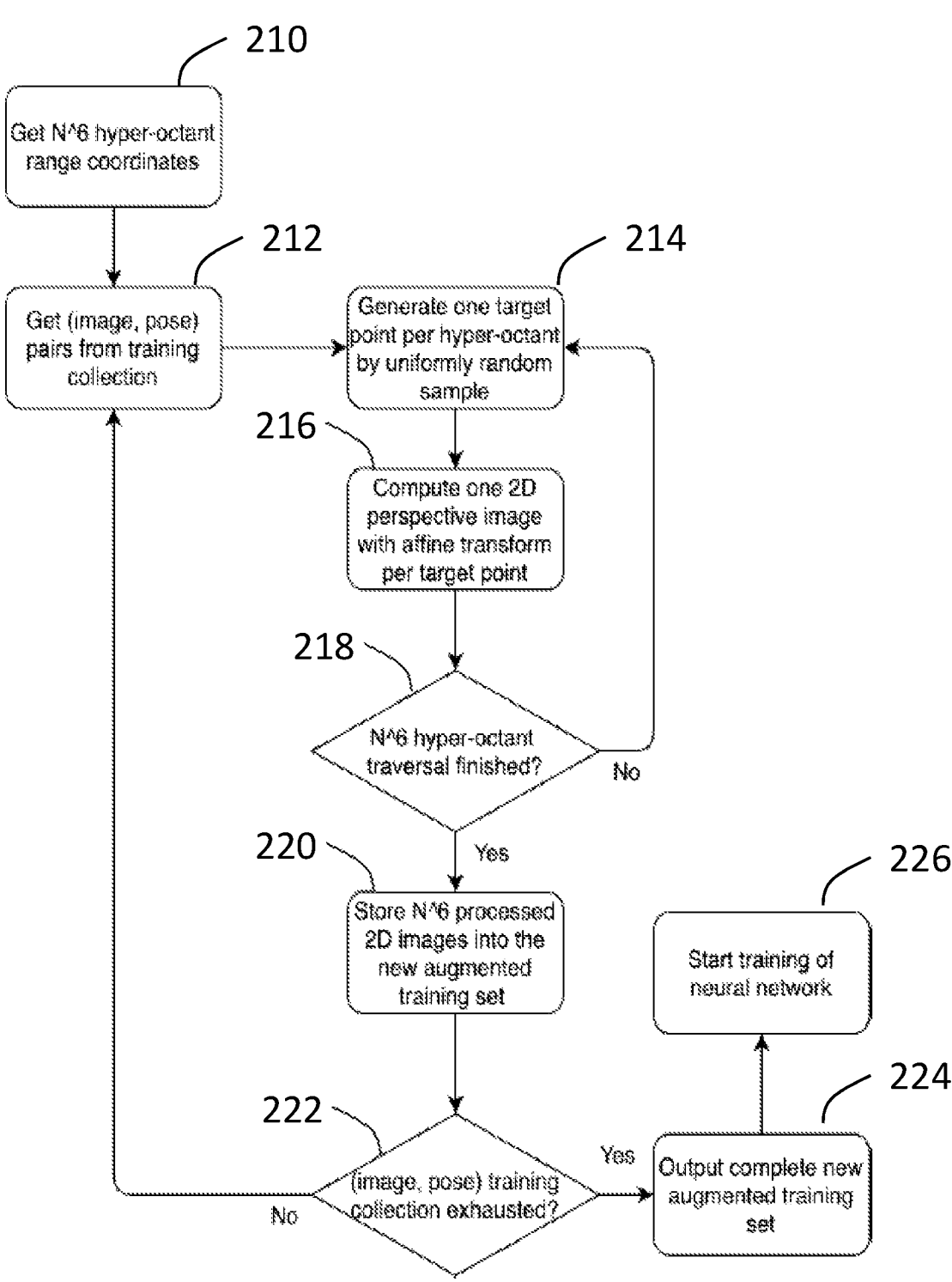
FIG. 9 illustrates one embodiment of a process using an affine transform for selected hyper-octants in the creation of an augmented data set.

Turning now to FIGS. 7, 8, and 9, another system and method useful to synthetically generate additional images from an initial but limited training set of images is depicted. FIG. 7 depicts a flow chart of operations useful in gathering an initial set of training images by operating a robot. The operation depicted in FIG. 7 can be accomplished once, or multiple times, to collect the initial set of training images. Briefly stated, the flow chart starts at 186 with a procedure to start the robot assembly, and if the assembly is not completed at 188, then the robot is operated at 190 to move towards the vehicle. Images are collected at 192 as the robot is moved towards the vehicle. In one form the images can be collected with a flash synchronized camera. At 194 the pose of the vehicle is determined and matched up with the image taken of the vehicle. The pose can be determined using any variety of techniques, including feature-based object tracking, and/or neural network-based pose regression, to name just a few. After the pose is matched up with the image the flow returns to 188 to determine if assembly is done. If it is not, the robot is moved again at 190, images are collected at

192, and the pose is matched up with the image at 194. When assembly is determined to be complete at 188 then the system is halted at 196.

FIG. 8 depicts a process whereby the boundary values are determined for the maximum and minimum pose values related to each of the three translations and three rotations. An initial set of boundary values are set at 196 and are potentially updated as the operations in FIG. 8 progresses. The initial boundary values can be set based upon a kinematic analysis of the system, but other assessments are also contemplated. All images from the initial training set of images, or a subset if needed, collected in FIG. 7 are cycled through the operations in FIG. 8 in a serial manner. To take one image as an example, step 198 will obtain the pose data from a given image, and if any of the pose values from the 6-D pose set are more extreme at 200 (i.e. any pose value of the 6-D pose data is greater than a maximum boundary value and lesser than a minimum boundary value associated with its respective axis) then the associated boundary value is reset to the value in the pose at step 202. If the pose is not more extreme, then the operation progresses to step 204 to determine if every image from the initial image set from FIG. 7 has been evaluated by the operations of FIG. 8. If more images remain to be evaluated, then the operation returns to step 198. If, however, all images have been processed then the procedure sets the boundary values at 206, and the procedure advances to step 208 which is included in FIG. 9. The procedure in FIG. 8 need not be used in every embodiment. Some embodiments may permit the initial training set to not overlap in scope with the maximum and minimum boundary values used for the procedure detailed in FIG. 9.

The procedure depicted in FIG. 9 starts at step 210 in which information from FIG. 8 in the form of the boundary value maximums and minimums are used in conjunction with a selection of a number N of partitions along each of the separate dimensions (each of the translation and rotation axes). For sake of simplicity the number of partitions along each of the separate dimensions are all equal to N in the illustrated embodiment, but in some forms any individual dimension may have a different number of partitions. Furthermore, although it is contemplated that the partitions will be equally spaced along the dimension, in some non-limiting embodiments the partitions may not be equally spaced. Additionally, in some embodiments with wide ranges of the boundary value maximums and minimums, the value N (i.e. the number of partitions) can be dynamically determined based on predefined maximum allowed segment sizes. As will be appreciated, the partitions serve to form different segments of each dimension, much like a grid schema demarcates different segments of a graph. The partitioned axes form a three dimensional grid for each of the rotation and translation, the result of which can be deemed a 'hyperoctant' with a boundary value maximum at one end of each axis, a boundary value minimum at the opposite end of each respective axis, and any number of partitions therebetween.

Once the hyper-octants have been defined the procedure in FIG. 9 proceeds to select an image/pose pairing from the initial set of training images. FIG. 9 then proceeds to 214 to generate a random sample (uniform random sample in the illustrated embodiment, but other distributions are contemplated) a single target point (target pose) within each hyperoctant. Given the target point within each of the hyperoctants, the procedure then utilizes an affine transform to convert the original image/pose pairing that is obtained at 212 into a new image/pose pairing at each of the target point (target pose). The procedure loops back to 214 if not all target points have been used to generate a new image/pose pairing given the original image, but if all target points (target poses) have been exhausted the procedure moves to 220 where all of the new image/pose pairings resulting from affine transforms from the original image/pose pairing are stored. Once processing of the original image is complete in 220, the procedure moves to 222 where it is determined whether any other images from the initial set of training images remain to be transformed using steps 214, 216, 218, and 220. If so, the procedure returns to 212 to obtain another image/pose pairing. If, however, all images have been exhausted then the procedure progresses to 224 where the new augmented training set is output (e.g. stored in the database). Once the entire augmented training set is created a neural network can be trained upon the augmented training set at 226.

One aspect of the present application includes a method to augment sparse training data for a neural network, the method comprising: providing a first set of training images useful for training a neural network, each image of the first set of training images having a corresponding pose which includes a translation value along each of three separate axes and a rotation value about each of the three separate axes; identifying a desired set of images apart from the first set of training images to be used in training the neural network, each image of the desired set of images having a desired pose; and synthetically providing an augmented set of additional images based upon the first set of training images, the desired set of additional images, and the pose of each image of the desired set of additional images.

A feature of the present application includes wherein the synthetically providing includes providing the first set of training images to a generative adversarial network to generate a trained generator network.

Another feature of the present application includes wherein the providing the first set of training images also includes providing at least one image parameter associated with each image of the first set of images, wherein the at least one image parameter includes the pose and at least one of a lighting parameter and a color parameter, and wherein each image of the first set of training images is a two-dimensional (2D) image.

Yet another feature of the present application includes wherein the at least one image parameter includes the pose, lighting parameter, and color.

Still another feature of the present application includes wherein the desired set of additional images includes at least one of the at least one image parameter for each image of the desired set of additional images, and which further includes generating a raw synthetic image from a computer based model for each image of the desired set of additional images and applying the trained generator network to each of the raw synthetic images to provide the augmented set of additional images.

Yet still another feature of the present application includes wherein the operating upon the first set of training images includes defining boundary value maximum and boundary value minimum for each of the three rotations and the three translations which together define six dimensions associated with an image capture.

Still yet another feature of the present application includes wherein the defining boundary value maximum and boundary value minimum includes ensuring that the boundary value maximum and the boundary value minimum are coincident with the maximum and minimum variance of all images along all six dimensions.

A further feature of the present application includes creating a plurality of partitions along each of the six dimensions to form a plurality of hyperoctants formed between respective boundary value maximum and boundary value minimums along each axis.

A still further feature of the present application includes obtaining an image and its associated pose from the first set of training images where the image and associated pose are deemed an image/pose pair, generating a target point in each hyperoctant by random sample, and computing an affine transform from each image of the first set of training images into the target point of each hyper-octant of the plurality of hyperoctants to form an augmented training set.

A still yet further feature of the present application includes training a neural network based on the augmented training set Another aspect of the present application includes an apparatus structured to augment an initial training set of images for a neural network, the apparatus comprising: a database including a first set of training images from which an augmented set of additional images will be derived, each image of the first set of images including an associated pose defined as a translation and a rotation along each of three axes; and a controller structured to augment the first set of training images, the controller including instructions to: define a desired set of images apart from the first set of training images to be used in training the neural network, each image of the desired set of images having a desired pose; and synthesize an augmented set of additional images based upon the first set of training images, the desired set of additional images, and the pose of each image of the desired set of additional images.

A feature of the present application includes wherein the controller is further structured to define boundary value maximum and boundary value minimum for each of the three rotations and the three translations which together define six dimensions associated with an image capture.

Another feature of the present application includes wherein controller is further structured to adjust the boundary value maximums and boundary value minimums to be coincident with the maximum and minimum variance of the translations and rotations of all images in the first set of training images along all six dimensions.

Still another feature of the present application includes wherein controller is further structured to define a plurality of partitions along each of the six dimensions to form a plurality of hyperoctants formed between respective boundary value maximum and boundary value minimums along each axis.

Yet another feature of the present application includes wherein controller is further structured to obtain an image and its associated pose from the first set of training images where the image and associated pose are deemed an image/pose pair, generate a target point in each hyperoctant by random sample, and compute an affine transform from each image of the first set of training images into the target point of each hyper-octant of the plurality of hyperoctants to form an augmented training set.

Yet still another feature of the present application includes wherein controller is further structured to pass the augmented training set to a neural network and train the neural network based on the augmented training set Still yet another feature of the present application includes wherein the controller is further structured to provide the first set of training images to a generative adversarial network to generate a trained generator network.

A further feature of the present application includes wherein the images from the first set of training images include the pose and at least one additional image parameter, wherein the at least one additional image parameter includes at least one of a lighting parameter and a color parameter, and wherein each image of the first set of training images is a two-dimensional (2D) image.

A still further feature of the present application includes wherein each image from the first set of training images include the pose, lighting parameter, and color parameter.

A yet still further feature of the present application includes wherein the desired set of additional images includes at least one of the pose, lighting parameter, and color parameter for each image of the desired set of additional images, and wherein the controller is further structured to generate a raw synthetic image from a computer based model for each image of the desired set of additional images and applying the trained generator network to each of the raw synthetic images to provide the augmented set of additional images.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method to augment sparse training data for a neural network, the method comprising: providing a first set of training images useful for training a neural network, each image of the first set of training images having a corresponding pose which includes a translation value along each of three separate axes and a rotation value about each of the three separate axes; identifying a desired set of images apart from the first set of training images to be used in training the neural network, each image of the desired set of images having a desired pose; synthetically providing an augmented set of additional images based upon the first set of training images, the desired set of additional images, and the desired pose of each image of the desired set of additional images; wherein synthetically providing the augmented set of additional images includes defining a boundary value maximum and a boundary value minimum for each of the three rotations and the three translations of each of the first set of training images, which together define six dimensions associated with an image capture; and creating a plurality of partitions along each of the six dimensions to form a plurality of hyperoctants formed between respective boundary value maximum and boundary value minimums along each axis; wherein the augmented set of additional images is useful to generate realistic synthetic images where it may otherwise be inconvenient, costly, or impossible to obtain real images.

2. The method of claim 1, wherein the synthetically providing includes providing the first set of training images to a generative adversarial network to generate a trained generator network.

3. The method of claim 2, wherein the providing the first set of training images also includes providing at least one image parameter associated with each image of the first set of images, wherein the at least one image parameter includes the pose and at least one of a lighting parameter and a color parameter, and wherein each image of the first set of training images is a two-dimensional (2D) image.

4. The method of claim 3, wherein the at least one image parameter includes the pose, lighting parameter, and color.

5. The method of claim 3, wherein the desired set of additional images includes at least one of the at least one image parameter for each image of the desired set of additional images, and which further includes generating a raw synthetic image from a computer based model for each image of the desired set of additional images and applying the trained generator network to each of the raw synthetic images to provide the augmented set of additional images.

6. The method of claim 1, wherein the operating upon the first set of training images includes defining boundary value maximum and boundary value minimum for each of the three rotations and the three translations which together define six dimensions associated with an image capture.

7. The method of claim 6, wherein the defining boundary value maximum and boundary value minimum includes ensuring that the boundary value maximum and the boundary value minimum are coincident with the maximum and minimum variance of all images along all six dimensions.

8. The method of claim 6, which further includes creating a plurality of partitions along each of the six dimensions to form a plurality of hyperoctants formed between respective boundary value maximum and boundary value minimums along each axis.

9. The method of claim 8, which further includes obtaining an image and its associated pose from the first set of training images where the image and associated pose are deemed an image/pose pair, generating a target point in each hyper-octant by random sample, and computing an affine transform from each image of the first set of training images into the target point of each hyperoctant of the plurality of hyperoctants to form an augmented training set.

10. The method of claim 9, which further includes training a neural network based on the augmented training set.

11. An apparatus structured to augment an initial training set of images for a neural network, the apparatus comprising: a collection of images including a first set of training images from which an augmented set of additional images will be derived, each image of the first set of images including an associated pose defined as a translation and a rotation along each of three axes; and a controller structured to augment the first set of training images, the controller including instructions to: define a desired set of images apart from the first set of training images to be used in training the neural network, each image of the desired set of images having a desired pose; synthesize an augmented set of additional images based upon the first set of training images, the desired set of additional images, and the desired pose of each image of the desired set of additional images; wherein the controller is further structured to define boundary value maximum and boundary value minimum for each of the three rotations and the three translations which together define six dimensions associated with an image capture; and define a plurality of partitions along each of the six dimensions to form a plurality of hyperoctants formed between respective boundary value maximum and boundary value minimums along each axis; wherein the augmented set of additional images is useful to generate realistic synthetic images where it may otherwise be inconvenient, costly, or impossible to obtain real images.

12. The apparatus of claim 11, wherein the controller is further structured to define boundary value maximum and boundary value minimum for each of the three rotations and the three translations which together define six dimensions associated with an image capture.

13. The apparatus of claim 12, wherein the controller is further structured to adjust the boundary value maximums and boundary value minimums to be coincident with the maximum and minimum variance of the translations and rotations of all images in the first set of training images along all six dimensions.

14. The apparatus of claim 12, wherein the controller is further structured to define a plurality of partitions along each of the six dimensions to form a plurality of hyperoctants formed between respective boundary value maximum and boundary value minimums along each axis.

15. The apparatus of claim 12, wherein the controller is further structured to obtain an image and its associated pose from the first set of training images where the image and associated pose are deemed an image/pose pair, generate a target point in each hyperoctant by random sample, and compute an affine transform from each image of the first set of training images into the target point of each hyper-octant of the plurality of hyperoctants to form an augmented training set.

16. The apparatus of claim 15, wherein the controller is further structured to pass the augmented training set to a neural network and train the neural network based on the augmented training set.

17. The apparatus of claim 11, wherein the controller is further structured to provide the first set of training images to a generative adversarial network to generate a trained generator network.

18. The apparatus of claim 17, wherein the images from the first set of training images include the pose and at least one additional image parameter, wherein the at least one additional image parameter includes at least one of a lighting parameter and a color parameter, and wherein each image of the first set of training images is a two-dimensional (2D) image.

19. The apparatus of claim 18, wherein each image from the first set of training images include the pose, lighting parameter, and color parameter.

20. The apparatus of claim 18, wherein the desired set of additional images includes at least one of the pose, lighting parameter, and color parameter for each image of the desired set of additional images, and wherein the controller is further structured to generate a raw synthetic image from a computer based model for each image of the desired set of additional images and applying the trained generator network to each of the raw synthetic images to provide the augmented set of additional images.

\* \* \* \* \*